United States Patent [19]

Guzik et al.

[11] Patent Number: 4,892,486

[45] Date of Patent: Jan. 9, 1990

[54] PORTABLE COMMUNICATIONS DEVICE ADAPTOR

[75] Inventors: Andrzej T. Guzik, Pompano Beach; Rudy Yorio, Boca Raton; Joseph A. Budano, II, Plantation; Mark Tellam, Parkland, all of Fla.

[73] Assignee: Motorola, Inc., Schaumburg, Ill.

[21] Appl. No.: 279,002

[22] Filed: Dec. 2, 1988

[51] Int. Cl.[4] .......................................... H01R 13/629
[52] U.S. Cl. .................................... 439/248; 439/259; 439/297; 455/90
[58] Field of Search ............................... 439/246–248, 439/252, 297, 298, 259–261, 266, 267, 269; 455/90

[56] References Cited

U.S. PATENT DOCUMENTS

| | | | |
|---|---|---|---|
| 3,917,372 | 11/1975 | Selinko | 439/259 |
| 4,091,318 | 5/1978 | Eichler et al. | 455/90 |
| 4,540,227 | 9/1985 | Faraci | 439/260 |

Primary Examiner—Gary F. Paumen
Attorney, Agent, or Firm—Joseph P. Krause; Steven G. Parmelee

[57] ABSTRACT

A vehicular adaptor for a portable communications device, such as a cellular telephone, pager, or two-way radio, is disclosed which includes a connector that aligns itself to a mating connector on the communication device. The connector permits spatial alignment of electrical contacts in the connector with electrical contacts in the communications device. A corrugated spring mounting clamp and a locating nest on the connector permit the alignment of connections.

16 Claims, 2 Drawing Sheets

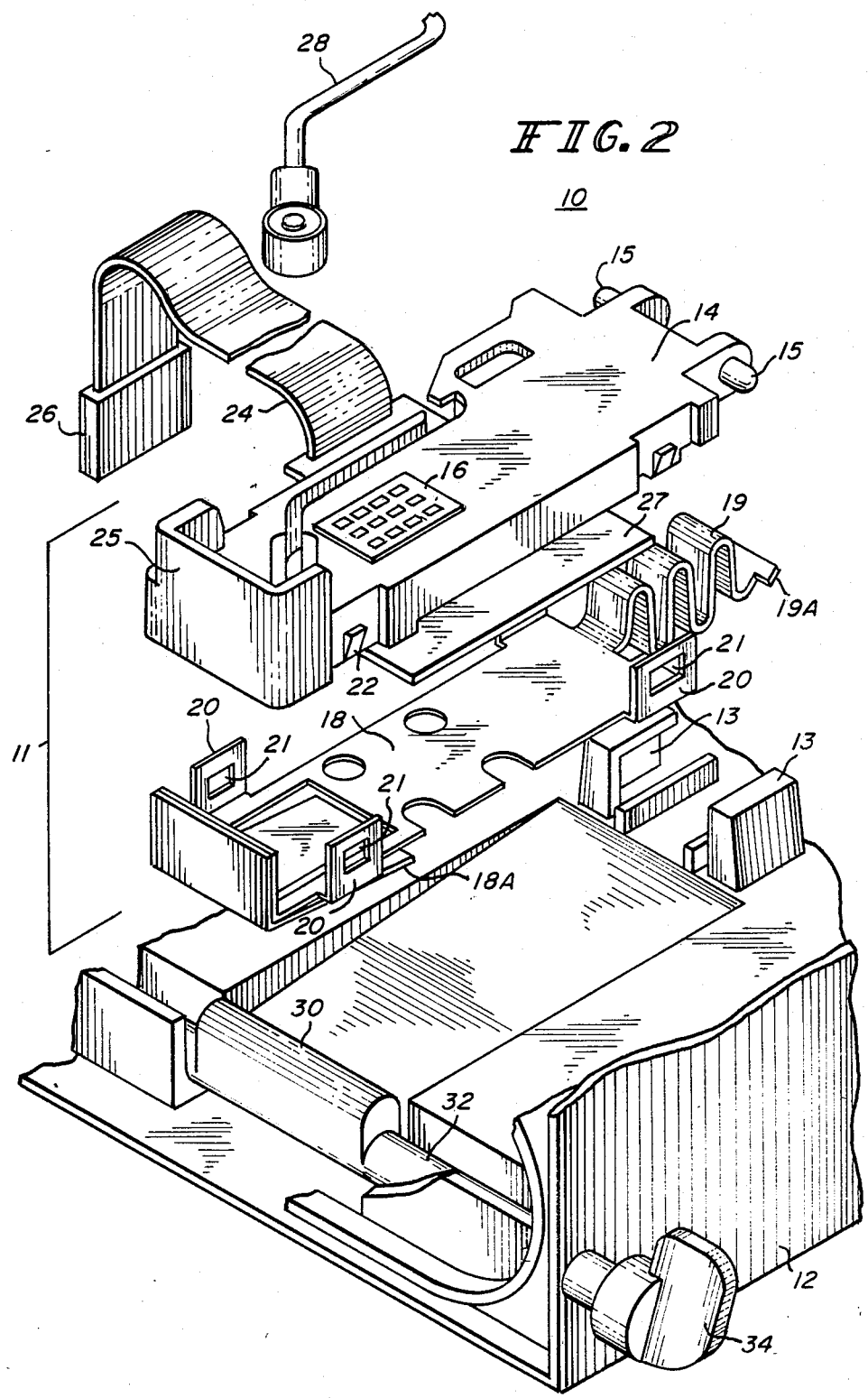

PORTABLE COMMUNICATIONS DEVICE ADAPTOR

BACKGROUND OF THE INVENTION

This invention generally relates to connectors. More specifically this invention relates to an adaptor used to couple a portable communications device such as a cellular telephone, a two-way radio or a pager to a separate antenna, power source, or external communications device.

Many portable communications devices with an internal battery pack are designed to be operable while in a fixed or base station adapter which allows the device to use external peripherals. Communications devices designed to operate from an adaptor usually have externally accessible connections, such as antenna and power connections, to permit the device to be operated from the adaptor.

A problem with operating a portable communications device, using an adapter, has been the reliability of the electrical connections between the device and the adapter. Slight misalignment between connectors on the device and the adaptor can prevent the device from making a connection preventing the device from operating, possibly damaging connectors on the communications device itself. In some applications, a portable communications device might be inserted into and removed from an adaptor thousands of times over the life of the device. Repetitive connecting and disconnecting of misaligned electrical contacts can wear the contacts to the point where an electrical connection cannot be reliably made.

Some prior art adaptors for portable communications devices try to avoid the problems associated with misaligned contacts by relying on judicious placement of mating electrical contacts on the device. Exact alignment between connections in an adaptor and on a communications device is difficult to achieve however because of dimensional tolerances. Other adapters rely on complex mechanical linkages to automatically mate connectors on the device and adapter but these are expensive and may be themselves unreliable.

A problem with adapters used in vehicles has been the degradation of the electrical connections caused by vibration in a vehicle. Vibration occurring in a vehicle can be transmitted to an adapter for a communications device and degrade the electrical connections between the device and the adapter.

SUMMARY OF THE INVENTION

An object of the present invention is to provide a reliable and vibration-proof connection between a portable communications device such as a two-way radio and a fixed adaptor for the device.

To achieve the forgoing object and other objects of the present invention there is provided an adaptor including a housing dimensioned to receive a portable communications device with external contacts. The adaptor has self-aligning electrical contacts that automatically mate to contacts on the device and compensate for misalignment between the device and the adapter. The adaptor also absorbs vibration between the device and the adapter.

The adaptor is comprised of a base, a connector assembly, including electrical contacts mounted to the base, and a rotatably mounted cam for engaging contacts on the connector assembly with contacts on the communications device. The connector assembly aligns itself in at least two dimensions with contacts on a communications device inserted in the adaptor.

BRIEF DESCRIPTION OF THE DRAWINGS

FIG. 2 shows an exploded view of the adaptor.

DETAILED DESCRIPTION OF THE PREFERRED EMBODIMENT

Figure 1:
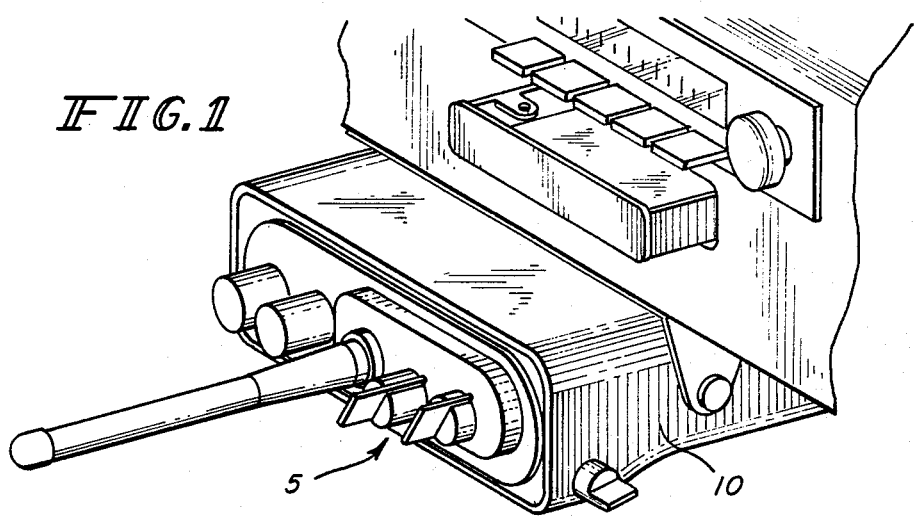
FIG. 1 shows an isometric view of a radio mounted in the adaptor.

Referring to FIG. 1, there is shown an isometric view of a portable communications device or radio 5 inserted into the adaptor 10. Radio 5, and adaptor 10, are shown in FIG. 1 positioned under the dash board of a vehicle. When in the adaptor 10, radio 5 may be operated by drawing electrical power from the vehicles electrical system as well as possibly using an external antenna, speaker or microphone.

Referring to FIG. 2, there is shown an exploded, isometric view of the adaptor 10, of the present invention. The adaptor 10 is comprised of a mounting base 12, which is shown cut-away in FIG. 2. Other constituent parts of the adaptor 10 are attached to the mounting base 12.

The adaptor 10 of the invention includes a movable connector assembly 11 which comprises contact carrier 14, electrical contacts 16, cable 24, circuit board 27.

Contact carrier 14 includes an integral locating nest 25 and integral pivot pins 15. The locating nest 25 has "lead-in" surfaces designed to mate to companion surfaces on the radio 5. The pivot pins 15 are designed to rotate within a mounting boss 13 on the mounting base.

Electrical contacts 16, which mate to electrical contacts on the communications device, are mounted in the contact carrier 14 in an integral opening in the contact carrier that is sized to accept electrical contacts 16. Electrical contacts 16 may be held in place in contact carrier by any suitable method, a press fit for instance. Electrical contacts 16 make contact with conductive paths on circuit board 27 which includes conductive circuit traces that permit electrical connection of conductors in cable 24 to be attached to circuit board 27.

Dual-axis spring 18 includes four locating tabs 20; three of which are shown in FIG. 2. Each locating tab 20 is constructed with an internal cutout 21 sized to mate with locking tabs 22, which are integrally formed as part of contact carrier 14. In the preferred embodiment, four locking tabs 22 are positioned approximately at the corners of the contact carrier 14. By interlocking the locking tabs 20 with locating tabs 22 the contact carrier 14, circuit board 27 and dual-axis spring 18 form connector assembly 11.

Dual-axis spring 18 as shown in FIG. 2 includes corrugated spring section 19. Corrugated spring section 19 includes two mounting tabs 19A, constructed and positioned to permit the connector assembly 11 to be mounted to mounting boss 13 by means of the pivot pins 15 and locating tabs 19A. During assembly of the adaptor 10, mounting tabs 19A and pivot pins 15 are positioned in mounting boss 13 so as to extend dual-axis spring 18 so that it exerts a force acting to maintain connector assembly 11 against cam 30.

The connector assembly 11 is positioned in mounting boss 13 so that pivot pins 15 and locating tabs 19A of dual-axis spring 18 fit into the mounting boss 13 relatively loosely, permitting the connector assembly to move with respect to the mounting base 12. When fit into mounting boss 13, the relatively loose fit of pivot pins 15, locating tabs 19A and the corrugated spring section 19 of dual-axis spring 18 permit compensation for misalignment between contacts on a radio and the adaptor and also act to absorb vibration of a radio or the mounting base 12 by moving with respect to mounting boss 13 when locating nest 25 mates with corresponding surfaces on a radio.

Still referring to FIG. 2, it will be seen that contact carrier 14 includes at one end, the locating nest 25, integrally formed in contact carrier 14. Locating nest 25 has sloping lead-in surfaces to permit the locating nest 25 to find a "mating" lead-in surface on a communications device. (A "mating" lead-in surface would be a surface which has conforming surfaces such that the sloping lead-in surfaces of locating nest 25 urge the electrical contacts 16 into alignment with electrical contacts on radio 5.) When the connector assembly 11 is mounted to mounting base 12 by means of self-loading locating tabs 19A and pivot pins 15, the entire assembly of connector carrier 11 can be moved with respect to both the communications device and mounting base 12 permitting locating nest 25 to align the connector assembly 11 to the radio, prior to engagement of the electrical contacts 16 with mating contacts on the radio.

Shaft 32 with cam 30 is movable about its axis of rotation, by means of actuator 34. Shaft 32 and cam 30 are positioned within mounting base 12 to contact the cantilever portion 18A of dual axis spring 18. Actuator 34 is located outside of the mounting base 12 where a user can operate it. Rotation of actuator 34 causes shaft 32 including the cam 30 to rotate about the axis of shaft 32. When the completed connector assembly 11 is attached to the mounting base 12 by means of pivot pins 15 and locating tabs 19A, rotation of shaft 32 causes cam 30 to displace connector assembly 11 toward a radio in the adaptor 10.

When the connector assembly 11 is moved toward the radio, the lead-in surfaces of locating nest 25 of contact carrier 14 "find" a companion lead-in surface on the radio in adaptor 10 and align and guide electrical contacts in the contact carrier 14 to electrical contacts on the device. Misalignment of assembly 11 relative to the radio 5 is compensated for by means of the corrugated spring section 19 of dual-axis spring 18 which permits alignment of contacts 16 to contacts on the radio 5 in up to three orthogonal dimensions. If a radio is inserted into the adaptor 10 in such a way that it's contacts are not initially aligned with electrical contacts 16, the corrugated spring section 19 permits translational movement movement of the assembly 11 to insure that the contacts are properly mated. Vertical movement of assembly 11 is also permitted by means of corrugated spring section 19 being extended as assembly 11 is moved toward radio 5 in adaptor 10.

Another function of the corrugated spring section 19 is to insure that assembly 11 disengages from the radio 5 when the actuator 34 is rotated to release the radio 5 from the adaptor 10. Corrugated spring 19 applies a force in a direction away from the radio 5.

In the preferred embodiment mounting base 12 is made of cast aluminum but could be any other suitable material. Cam 30 including shaft 32 and actuator 34 is a two-piece molded plastic sized to fit holes in adaptor 12. Cam 30 shaft 32 and actuator 34 could be any suitable material, metallic or plastic. Connector assembly 14 is a molded plastic piece with latching tabs 22 included as an integral elements. Dual-axis spring 18, including locating tabs 20 and locating cutouts 21 and including corrugated spring 19 with locating tab 19A is a stamped metallic piece but could also be formed from any suitable material to provide resilient behavior necessary for a spring.

Figure 3:
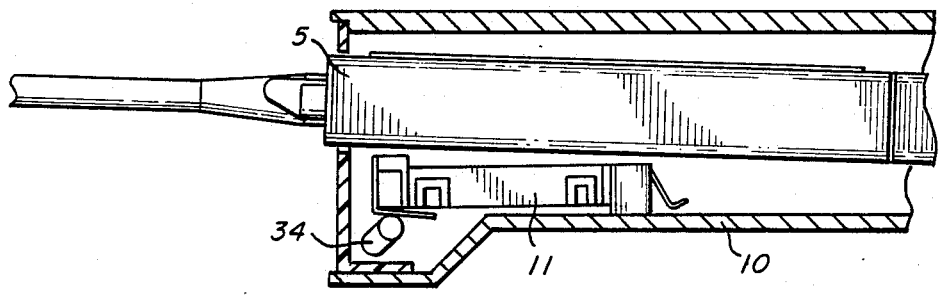
FIG. 3 shows a side view of a radio in the adaptor, with the radio's contacts not engaging the corresponding contacts of the adaptor.
Figure 4:
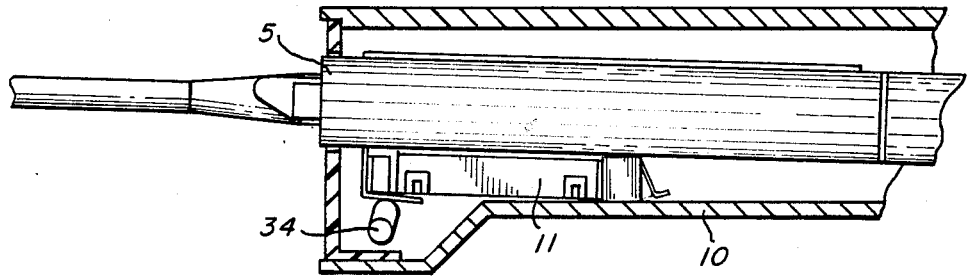
FIG. 4 shows a side view of the radio in the adaptor with the radio's contacts engaged to corresponding contacts of the adaptor.

FIG. 3 shows a cross-sectional view of the radio 5 inserted in adaptor 10 with the connector assembly 11 disengaged from electrical contacts from the radio 5. FIG. 4 shows the radio 5 in the adaptor 10 but with actuator 34 causing the contacts of assembly 11 to contact the contacts of with radio 5. Actuator 34 in the preferred embodiment is manually operated by an operator.

In review, there is shown an improved adaptor for portable communications devices. While a specific embodiment of the invention has been shown and described herein, further modifications and improvements may be made by those skilled in the art. Modifications which retain the basic underlying principles disclosed and claimed herein are within the scope of this invention.

What is claimed is:

1. A adaptor for receiving therein a portable communications device having a first set of accessible electrical contacts, said adaptor comprised of:
   a mounting base adapted to receive said portable device therein;
   a connector assembly having a second set of electrical contacts disposed to mate with said first set of accessible electrical contacts;
   means which mounts said connector assembly to said mounting base so that said second contact set can be moved with respect to said communications device in at least two orthogonal dimensions to permit alignment with said first contact set when said communications device is received in said adaptor; and
   actuator means for moving said connector assembly with respect to said mounting base so as to cause said first and second contact sets to mate.

2. The adaptor of claim 1, wherein said first and second contact sets are engaged when said connector assembly is in a first position and disengaged when said connector assembly is in a second position.

3. The adaptor of claim 2, wherein said connector assembly includes guide means for aligning said first and second contact sets when said connector assembly is moved from said second position to said first position.

4. The adaptor of claim 3, where said guide means is a locating nest having lead-in surfaces mating with corresponding surfaces on said communications device.

5. The adaptor of claim 2, further comprising means for exerting a force on said connector assembly such that said connector assembly is urged toward said first position.

6. The adaptor of claim 5 where said means for exerting a force on said connector assembly is a spring, said spring permitting alignment of said means for mounting said connector assembly in said at least two dimensions.

7. The adaptor of claim 6 where said spring has at least one corrugated segment.

8. The adaptor of claim 1 where said actuator means is comprised of at least one eccentric cam on a shaft rotatably mounted in said mounting base.

9. The adapter of claim 1, wherein said mount means includes means for aligning said first set of accessible contacts with said second set of electrical contacts in three orthogonal dimensions.

10. The adaptor of claim 1, wherein said portable communications device is a radio device.

11. An electrical connector mating with a portable communications device, said portable communications device having a first set of accessible electrical contacts, said connector being mounted in an adaptor that receives said portable communications device, said electrical connector comprised of:

a connector assembly having a second set of electrical contacts capable of mating with said first set of accessible electrical contacts; and means which mounts said contact assembly in said adaptor so that said second contact set can be moved with respect to said portable device in at least two orthogonal. dimensions to permit alignment with said first contact set when said portable device is received in said adaptor.

12. The electrical connector of claim 11, being further comprised of guide means for aligning said first and second contact sets.

13. The electrical connector of claim 11, wherein said guide means for aligning said first and second sets is a locating nest.

14. The electrical connector of claim 11, wherein said mount means is a dual axis spring.

15. The electrical connector of claim 13, wherein said dual axis spring includes at least one corrugated spring segment.

16. The electrical connector of claim 11, wherein said mount means includes means for aligning said first set of accessible contacts set with said second set of electrical contacts in three orthogonal dimensions.

* * * * *